(12) United States Patent
Koelewyn (10) Patent No.: US 6,286,772 B1
(45) Date of Patent: Sep. 11, 2001

(54) FLY FISHING REEL WITH ADJUSTABLE DRAG SYSTEM, REMOVABLE SPOOL AND SELECTABLE ANTI-REVERSE

(76) Inventor: Robert W. Koelewyn, 776 Hill Farm Rd., Fairfield, CT (US) 06430

( * ) Notice: Subject to any disclaimer, the term of this patent is extended or adjusted under 35 U.S.C. 154(b) by 0 days.

(21) Appl. No.: 09/447,852

(22) Filed: Nov. 23, 1999

Related U.S. Application Data (63) Continuation-in-part of application No. 08/979,087, filed on Nov. 26, 1997, now Pat. No. 5,988,547.

(51) Int. Cl.[7] .................................................. A01K 89/02
(52) U.S. Cl. ........................ 242/246; 242/295; 242/321; 242/322
(58) Field of Search .................................. 242/317, 318, 242/321, 322, 246, 247, 295, 298, 303, 307

(56) References Cited

U.S. PATENT DOCUMENTS

| | | | |
|---|---|---|---|
| 2,142,967 | * | 1/1939 | Russell .................................. 242/321 |
| 3,510,083 | * | 5/1970 | Cook ..................................... 242/318 |
| 3,572,607 | * | 3/1971 | Wilson .................................. 242/298 |
| 4,750,687 | * | 6/1988 | Slievert et al. ....................... 242/317 |
| 5,407,144 | * | 4/1995 | Ryall .................................... 242/318 |
| 5,609,309 | * | 3/1997 | Oh ........................................ 242/317 |
| 5,626,303 | * | 5/1997 | Bringsen .............................. 242/295 |
| 5,918,826 | * | 7/1999 | Arkowski ............................. 242/317 |
| 5,921,492 | * | 7/1999 | Bauer ................................... 242/317 |
| 6,053,445 | * | 4/2000 | Farris ................................... 242/317 |
| 6,073,871 | * | 6/2000 | Farris et al. ......................... 242/317 |

* cited by examiner

*Primary Examiner*—Emmanuel M. Marcelo
(74) *Attorney, Agent, or Firm*—Ware, Fressola, Van Der Sluys & Adolphson LLP

(57) ABSTRACT

A fishing reel has a frame adapted for mounting fishing reel to a rod, and a spindle is mounted in anti-reverse mechanism received in the frame for one way rotation with respect to the frame. An axle tube is mounted on the spindle by a drag assembly for adjustably permitting rotation of the axle tube against the anti-reverse mechanism, and a spool is removably received and secured in interlocking engagement on the axle tube. Therefore, the spool may be removed and replaced on the axle tube independent of the anti-reverse mechanism and drag assembly, and the anti-reverse mechanism may be reversed for opposite rotation of the spool. A drag assembly mounts the axle tube to the spindle by two ball bearings assemblies and a clutch pack of washers. An adjustment mechanism compresses the clutch pack of washers through the inner races of the bearing assemblies, so that the spool rotates with the axle tube with a minimum of friction.

34 Claims, 7 Drawing Sheets

FLY FISHING REEL WITH ADJUSTABLE DRAG SYSTEM, REMOVABLE SPOOL AND SELECTABLE ANTI-REVERSE

This application is a continuation-in-part of my application Ser. No. 08/979,087, file Nov. 26, 1997 now U.S. Pat. No. 5,988,547.

FIELD OF THE INVENTION

This invention relates to fishing reels and more particularly to a fly fishing reel having an adjustable drag assembly incorporated in a hub mounting a removable spool.

BACKGROUND OF THE INVENTION

In sport fishing, one of the challenges is to land a fish using a line of relatively light weight with respect to the weight of the fish. The term "weight" of the line is a term specifying its strength, usually expressed as "n" pounds test line, where "n" is the number of pounds of tensile strength of the line. Typically, fishing line can have a tensile strength in the range of approximately 2–50 pounds.

One way to protect the line against breakage is to utilize a fishing reel incorporating a drag assembly. In some such reels, the drag assembly provides an interface between a spool carrying the fishing line and a hand operated shaft and crank for turning the spool. In fly fishing reels, the drag assembly acts between a frame and a spool, with the handle for turning the spool being a part of the spool. The object is to adjust the drag so that the spool will slip relative to the shaft and crank or frame and thereby protect the line from breaking by releasing the line from the spool.

It will further be appreciated that in crank type reels, the drag system provides for the unwinding and release of line without having to rotate the shaft and crank assembly. If a large fish, full of fight, is hooked, the fish may dive or run and thereby unwind line rapidly from the spool. Typically, such unwinding is too rapid for the fisherman to keep up through operation of the crank or handle. Releasing the crank or handle in such a situation is a poor option, as the reel then provides no resistance to unwinding, when such resistance is necessary for fighting and tiring the fish. Also, if the crank were released to permit the line to unwind, it would be difficult to regain control of the crank until such time as the fish slowed or stopped.

It will also be appreciated that the drag assembly limits the force that can be applied to the fish through the line as the fisherman reels in the fish or flexes the fishing rod. The drag assembly provides for slippage of the spool relative to the shaft and crank or handle, if the fisherman attempts to apply force in excess of the strength of the line or if the fish should suddenly apply such force to the line.

For best fishing results, the fisherman may want to set the drag to utilize the maximum strength of the fishing line without breaking the line. This requires that the drag assembly operate accurately and smoothly. In particular, it is important that the drag assembly operate to provide resistance to unwinding line from the spool, but be unaffected by other aspects of the operation of the reel, such as whether the line is being released from one of the sides or the center of the spool, and, of course, the operation of the drag assembly itself. Most importantly, the drag assembly should be adjustable to cooperate with the strength of the line, but must not inadvertently break the line and lose a large fish.

In fly reels, the spool may be mounted with anti-reverse features, so that it is essential that the drag system be smooth and reliable to avoid line breakage. In fly reels, it is also sometimes desirable to change line, and the ability to quickly change spools would greatly facilitate line changes.

SUMMARY OF THE INVENTION

It is a principal object of the invention herein to provide a drag assembly for fishing reels.

It is an additional object of the invention herein to provide a drag assembly for fishing reels which exhibits accurate, consistent and smooth operation.

It is a further object of the invention herein to provide a drag assembly for fishing reels which operates independently of other aspects of the fishing reel.

It is another object of the invention herein to provide a drag assembly for a fishing reel which is rugged and reliable.

It is also an object of the invention herein to provide a fly fishing reel with selectable direction of anti-reverse action.

It is an object of the invention to provide a fishing reel especially adapted for fly fishing.

It is an additional object of the invention to provide a fly fishing reel in which the spool is readily changeable.

In carrying out this invention and in one illustrative embodiment thereof, there is provided a fishing reel including a body adapted to be received by a rod, with the body mounting a shaft and crank for rotating the shaft. The shaft extends to a threaded distal end. A spool for windably releasing and retrieving fishing line is rotatably mounted surrounding the shaft by a drag assembly.

The drag assembly includes a first bearing assembly supporting a first side of the spool and a second bearing assembly having an inner ring slidably received with respect to the shaft and an outer ring supporting a second side of the spool adjacent the threaded distal end of the shaft. A clutch is received between the inner race of the second bearing and a clutch stop fixed with respect to the shaft. An adjustment mechanism is secured to the threaded distal end of the shaft for adjustably compressing the clutch between the inner race of the second bearing and the clutch stop, the clutch thereby providing an adjustable frictional engagement between the spool and the shaft.

According to aspects of the invention, the bearing assembly and its inner and outer rings are a ball bearing having an inner race and an outer race. The clutch is a clutch pack of washers including drag washers keyed to the shaft alternating with drag washers key to the spool. According to a more particular aspect, friction washers are provided between the shaft-keyed drag washers and the spool-keyed drag washers.

Also, according to aspects of the invention, the inner race of the first bearing is interposed between the clutch pack of washers and the clutch stop, and according to a particular aspect, the inner races of both bearings are used to compress the clutch pack. The clutch pack includes end drag washers positioned adjacent to the first and second bearing assemblies, the end drag washers being configured to provide clearance with respect to the outer race of the adjacent bearing.

According to additional aspects of the invention, the adjustment mechanism is threaded to the distal end of the shaft. A compression nut is provided for compressing a clutch spring providing compressive force on the clutch pack of washers. According to a particular structure, the clutch spring is restrained within a keeper.

According to further aspects of the invention, a hub is provided surrounding the shaft, and the hub defines the clutch stop, a bearing seat adjacent the clutch stop and a clutch washer shank for receiving the shaft-keyed washers. A thrust collar is also provided between the adjustment mechanism and the clutch pack of disks, and defines a seat for the second bearing assembly.

According to other aspects of the invention, seals are provided between the shaft and the spool for maintaining the clutch pack free of water or dirt to assure its smooth operation and long life.

The spool and drag assembly is advantageously utilized in a spinning reel, but may also be incorporated in fly casting reels, bait casting reels, and trolling reels.

In also carrying out this invention and in another illustrative embodiment thereof, there is provided a fly fishing reel having a frame adapted for mounting the reel to a rod. An axle tube is supported on a spindle that extends from the frame, the spindle mounted by anti-reverse means for one-way rotation with respect to the frame. A drag assembly is at least partially mounted within the axle tube for adjustably permitting rotation of the axle tube against spindle and the anti-reverse means. A spool is removably received and secured in interlocking engagement with the axle tube, thereby adapting the reel for spool replacement independent of the anti-reverse means and drag assembly.

According to additional aspects of the invention, the spool has an axial sleeve that slides over the axle tube in sliding interengagement therewith. One of the axle tube and sleeve has at least one slot and the other of the axle tube and sleeve has at least one projection that is slidably received in the slot such that the spool and axle tube rotate together. The axle tube may have a radial flange adjacent the frame, the flange defining a plurality of slots, and the sleeve may define a plurality of axially extending projections at its distal end that are receivable in the slots of the radial flange.

The axle tube may be provided with a threaded end and the spool is secured on the axle tube by a threaded spool lock ring turned onto the threaded end. The spool lock ring may be rotationally secured with the spool and removable and replaceable with the spool without separation from the spool.

According to other aspects of the invention, the anti-reverse means may include an anti-reverse housing removably and reversibly received in the frame for mounting the spindle for one-way rotation with respect to the frame, wherein the spindle and axle tube are removably mounted by the anti-reverse means. This permits the direction of rotation to be changed by removing the spindle and axle tube, removing and reversing the anti-reversing housing, and replacing the spindle and axle tube.

To facilitate changing the direction of rotation, the anti-reverse housing may be generally cylindrical and have a key received in a slot in the frame, so that the anti-reverse housing slides out for reversal and is replaced in in the reverse orientation.

Also according to aspects of the invention, the drag assembly includes the spindle extending at least partially through the axle tube mounting the spool, the spindle mounted in and extending from the anti-reverse means. A drag assembly is rotatably mounted in the axle tube surrounding the spindle. The drag assembly includes a first bearing assembly mounted between the spindle and the axle tube supporting a first portion of the axle tube more closely adjacent the frame. A second bearing assembly is mounted between the spindle and the axle tube, and has an inner ring and an outer ring, the second bearing assembly supporting an outer portion of the axle tube more distant from the frame. A clutch is received between the inner ring of the second bearing assembly and a clutch stop fixed with respect to the spindle, the clutch including at least one member secured to the spindle and at least one member secured to the axle tube. An adjustment mechanism is provided for adjustably compressing the clutch members between the inner ring of the second bearing assembly. The clutch stop provides an adjustable frictional drag engagement between the spindle and the axle tube, and thereby between the frame and the spool.

According to additional aspects of the invention, the clutch members are a clutch pack of washers having drag washers keyed to the spindle alternating with drag washers keyed to the axle tube.

According to further aspects of the invention, the bearing assembly having an inner ring and an outer ring is a ball bearing having an inner race and an outer race. Also, the first bearing assembly is a ball bearing having an inner race and an outer race, and the inner race is positioned between the clutch stop and the clutch.

The invention together with further objects, aspects, features and advantages will be more clearly understood from the following description of the preferred embodiment taken in connection with the accompanying drawings.

BRIEF DESCRIPTION OF THE DRAWINGS

The same reference numerals refer to the same elements throughout the various figures.

DESCRIPTION OF THE PREFERRED EMBODIMENT

Figure 1:
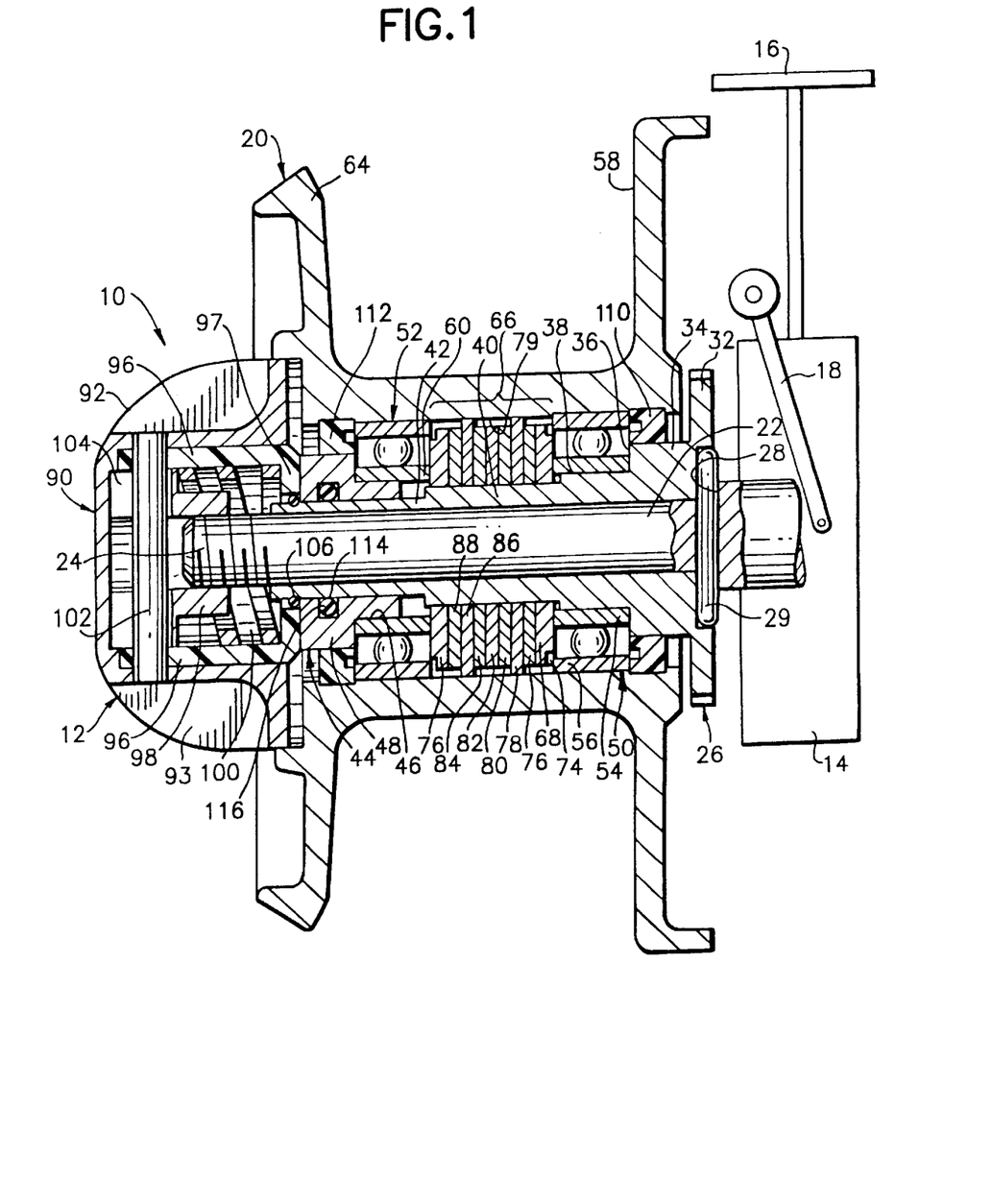
FIG. 1 is a sectional view of the spool and drag assembly of a fishing reel according to the invention herewith, the remainder of the fishing reel shown schematically.
Figure 2:
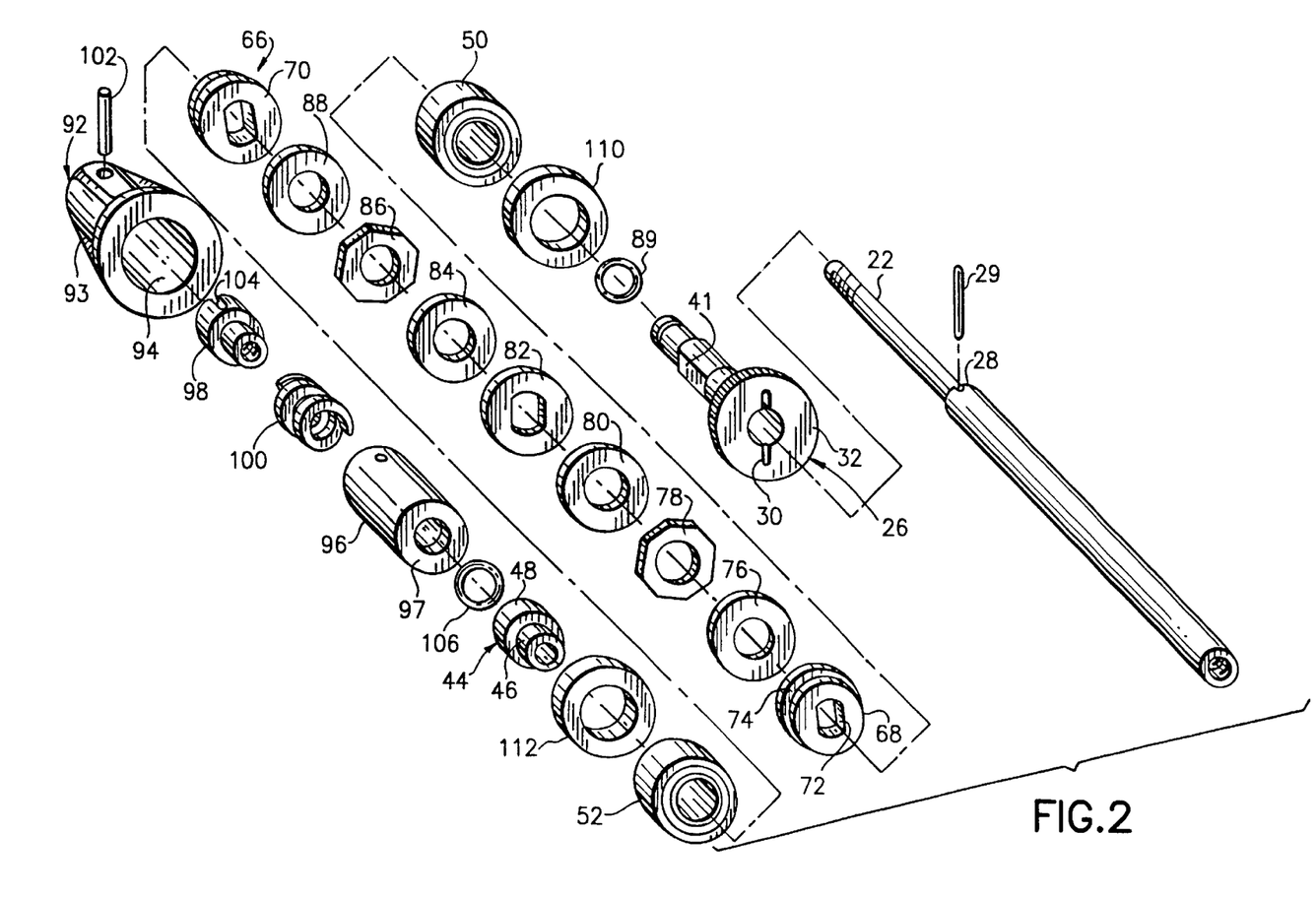
FIG. 2 is an exploded perspective view of parts of the drag assembly of the fishing reel of FIG. 1.
Figures 3, 4, 5:
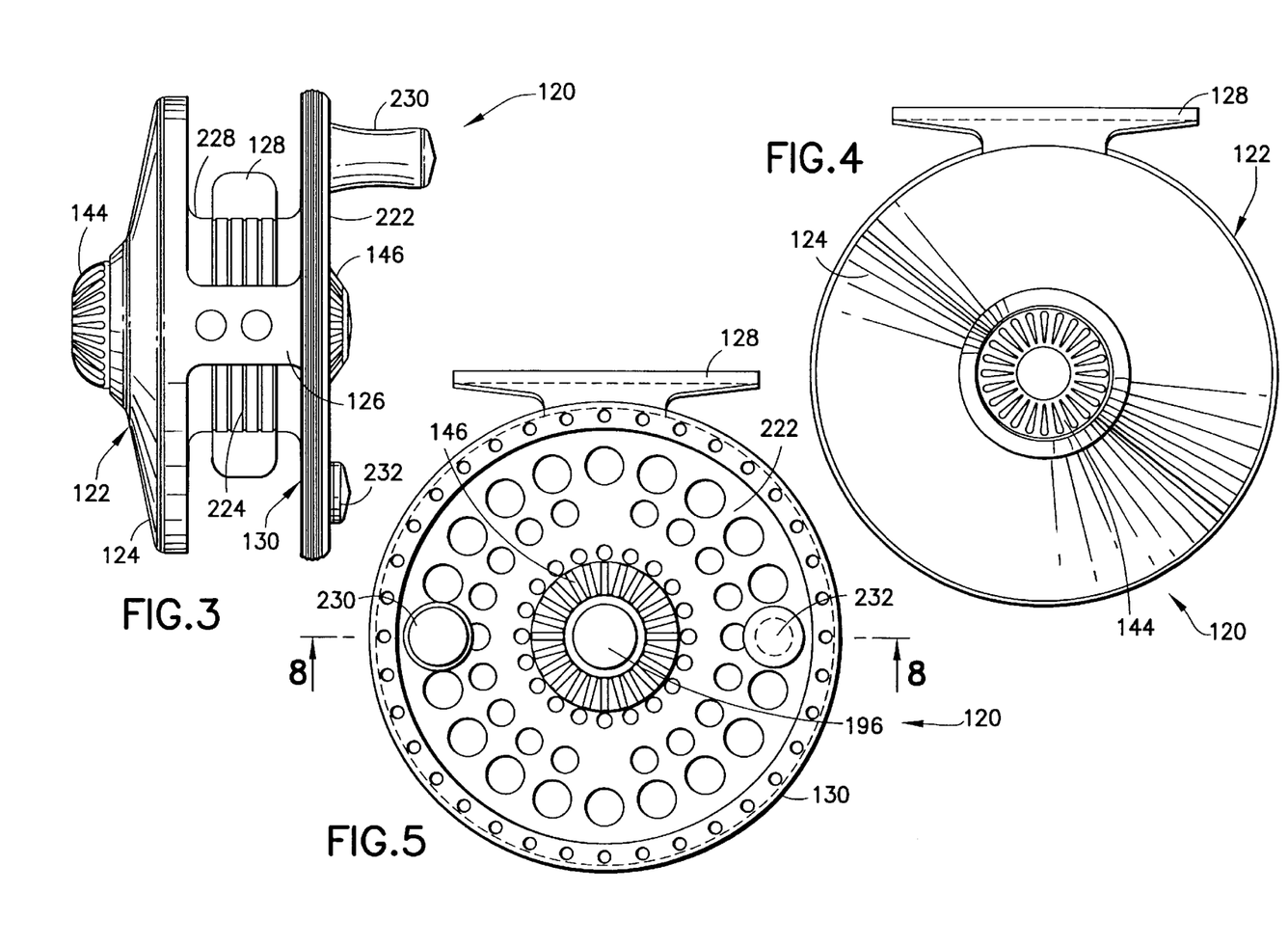
FIG. 3 is a bottom view of a fly fishing reel according to the invention herein.
FIG. 4 is a side view of the frame of the fly fishing reel of FIG. 3.
FIG. 5 is a side view of the fly fishing reel of FIG. 3, from the spool side.

A fishing reel 10 incorporating a drag assembly generally indicated at 12 is illustrated in FIG. 1, and parts of the drag assembly 12 are illustrated in FIG. 2. The fishing reel 10 includes a body 14, shown schematically, which includes a foot 16 adapted to mount the fishing reel 10 on a rod. The fishing reel 10, although shown schematically, is intended as a spinning reel, and has a crank 18 rotatably mounted with respect to the body for retrieving fishing line.

The fishing reel 10 further includes a spool 20 for windably releasing and retrieving fishing line, and the spool 20 is rotatably mounted surrounding a shaft 22 extending from the body 14 to a threaded distal end 24. The drag assembly 12 is generally interposed between the shaft 22 and the spool 20, and fictionally couples the spool 20 with the shaft 22. The drag assembly 12 is adjustable so that the spool 20 will rotate with respect to the shaft 22 if the force on line wound on the spool exceeds the coupling forces of the drag assembly.

The drag assembly 12 first comprises a center hub 26, which fits over the shaft 22 adjacent a step 28 therein, and is keyed to rotate with the shaft 22 by a pin 29 received in slot 30 of the inner end flange 32 of the center hub. The center hub 26 next comprises a shoulder 34 transitioning at clutch stop 36 to a bearing seat 38. Extending from the bearing seat 38 is a clutch washer shank 40, and an end tube 42. The clutch washer shank 40 is provided with opposed flat surfaces 41, best seen in FIG. 2.

A thrust collar 44 is slidably received on the end tube 42, and includes a bearing seat 46 and a head flange 48.

The spool 20 is mounted surrounding the shaft 22 on a first, inner bearing assembly 50 and a second, outer bearing assembly 52. The first bearing assembly 50 has an inner ring 54 received on the bearing seat 38 of the center hub 26, and an outer ring 56 supporting the inner end of the spool 20 adjacent its inner side wall 58. An inner ring 60 of the second, outer bearing assembly 52 is received on the bearing seat 46 of the thrust collar 44, and an outer ring 62 supports the outer portion of spool 20, adjacent its outer side wall 64. In the preferred embodiment shown, the bearing assemblies 50,52 are ball bearings having inner and outer races as their inner and outer rings.

The drag assembly 12 includes a clutch 66 including clutch members in the form of a clutch pack of washers, which are best seen individually in the exploded perspective view of FIG. 2. The clutch pack includes two shaft-keyed end drag washers 68 and 70, positioned respectively adjacent the first bearing assembly 50 and the second bearing assembly 52. By "shaft-keyed", it is meant that the center openings of the washers have two opposed flat edges which fit onto the flats 41 on the clutch washer shank 40 of the center hub 26, so that the washers do not turn relative to the center hub and the shaft 22 to which the center hub is pinned. For example, the center opening 72 of washer 68 is keyed in this manner. The shaft-keyed end drag washer 68 is also peripherally notched at 74 and, with reference to FIG. 1, this configuration permits the end drag washer 68 to bear against the inner race 54 of the first bearing assembly 50, but to avoid contact with the outer bearing race 56. The shaft-keyed end drag washer 70 is similarly peripherally notched to provide contact with the inner race 60 of bearing assembly 52 and avoid contact with the outer race 62 thereof.

Moving from left to right in FIGS. 1 and 2, the clutch pack of washers 66 also includes a friction washer 76 keyed to neither the shank 40 nor the spool 20, and an octagonal spool-keyed drag washer 78 which is keyed to the inside opening of the spool 20. By "spool-keyed", it is meant that the octagonal outside edge of washer 78 mates with a octagonally shaped portion 79 of the inside of spool 20, so that the washer 78 turns with spool 20 but is free to rotate with respect to the center hub 26 and the shaft 22. On the other hand, the shaft-keyed drag washers keyed to the shank 40 turn freely with respect to the spool 20 inside the portion 79.

Adjacent to octagonal spool-keyed drag washer 78 is another unkeyed friction washer 80, a shaft-keyed drag washer 82, another unkeyed friction washer 84, another octagonal spool-keyed drag washer 86, and another unkeyed friction washer 88 adjacent the shaft-keyed end drag washer 70. Accordingly, the clutch pack 66 is comprised of drag washers keyed to the shank and shaft 20 alternating with drag washers keyed to the spool, with friction washers between the center shaft-keyed drag washers and the octagonal spool-keyed drag washers. The keyed drag washers are made of stainless steel. The unkeyed friction washers 76, 80, 84 and 88 are made of Rulon, a synthetic polymer which provides suitable friction and good wear characteristics.

The thrust collar 44, bearing assembly 52, clutch pack 66 and bearing assembly 50 are maintained on the center hub 26 by a clip 106. This prevents inadvertent disassembly of these elements of the clutch pack.

The drag assembly 12 further comprises an adjustment mechanism 90 which operates to compress the clutch pack 66 and thereby adjust the frictional connection with the spool 20 and the shaft 22. The adjustment mechanism 90 includes a knob 92 having vanes 93 on its exterior surface for ease of rotation. The interior of the knob is formed as a cylindrical cavity 94 which receives a spring keeper cup 96 having annular end wall 97, a compression nut 98, and a clutch spring 100. The spring keeper cup 96 is pinned to the knob 92 by means of pin 102. The compression nut 98 is threaded to the threaded distal end 24 of the shaft 22, and is rotated by the pin 92, which extends through a slot 104 formed in the end of the compression nut. The slot is sufficiently long that the compression nut may move in and out on the shaft 22, depending upon its threaded adjustment thereon, without interference between the pin and the shaft. Such rotation of the compression nut 98 adjusts the pressure of the clutch spring 100, which is applied to the annular cup end 97 of the spring keeper cup 96.

The cup end 97 bears against the head flange 48 of thrust collar 44, and the thrust collar thereby transmits the force of the clutch spring 100 through the inner race 60 of bearing assembly 52 to the outer shaft-keyed end washer 70. This acts to compress the clutch pack 66 between the bearing race 60 of bearing assembly 52 and the inner bearing race 54 of bearing assembly 50, which is grounded against the clutch pack stop 36. The thrust collar 44 and bearing assembly 52 are incrementally slidable to transmit the force freely.

Therefore, the spool 20 may rotate with respect to the shaft 22 whenever the rotational force on the spool 20 exceeds the static frictional force within the clutch pack, and the clutch pack applies frictional force or drag between the shaft and spool. When the spool 20 does so rotate, it rotates on the bearing assemblies 50 and 52, which are of very low friction such that the adjustable frictional force of the clutch pack provides virtually all of the drag. But most importantly, the drag does not change because of the supporting structure for the spool or factors other than the clutch pack.

The clutch pack is sealed against moisture and dirt by two annular seals 110 and 112, respectively located just below the outer wall 58 and inner wall 64 of the reel. These seals are preferably fabricated of Nitril® composition and contribute a very small amount of predictable friction to the drag forces. An O-ring 114 carried by thrust collar 44 prevents moisture and dirt from entering the clutch pack along the center hub.

It will be appreciated that the consistency of the friction adjustment of the clutch pack is achieved by transmitting the force of compression independently of the rotation of the spool. In the fishing reel 10 described above, this is achieved by transmitting the compression force through the inner bearing races to the clutch pack washers. Additionally, if desired, the clutch pack could directly engage a structural clutch stop on the center hub, rather than engaging the inner bearing race 54 of the first bearing assembly 50. The bearing race 54 is conveniently available to bear against the clutch stop, but is merely an extension of the clutch stop.

It will also be appreciated that the drag assembly is useful in other types of reels than the spinning reel schematically shown. It can be adapted to fly casting reels, bait casting reels and trolling reels.

With reference to FIGS. 3–10, a fly fishing reel 120 according to the invention herein is illustrated. The fly fishing reel 120 has a frame 122 including a spool cover 124 having top and bottom of line retention arms 126, 127 with a foot 128 mounted to the top line retention arm 126 thereby adapting the frame and reel for mounting to a rod.

Figure 6:
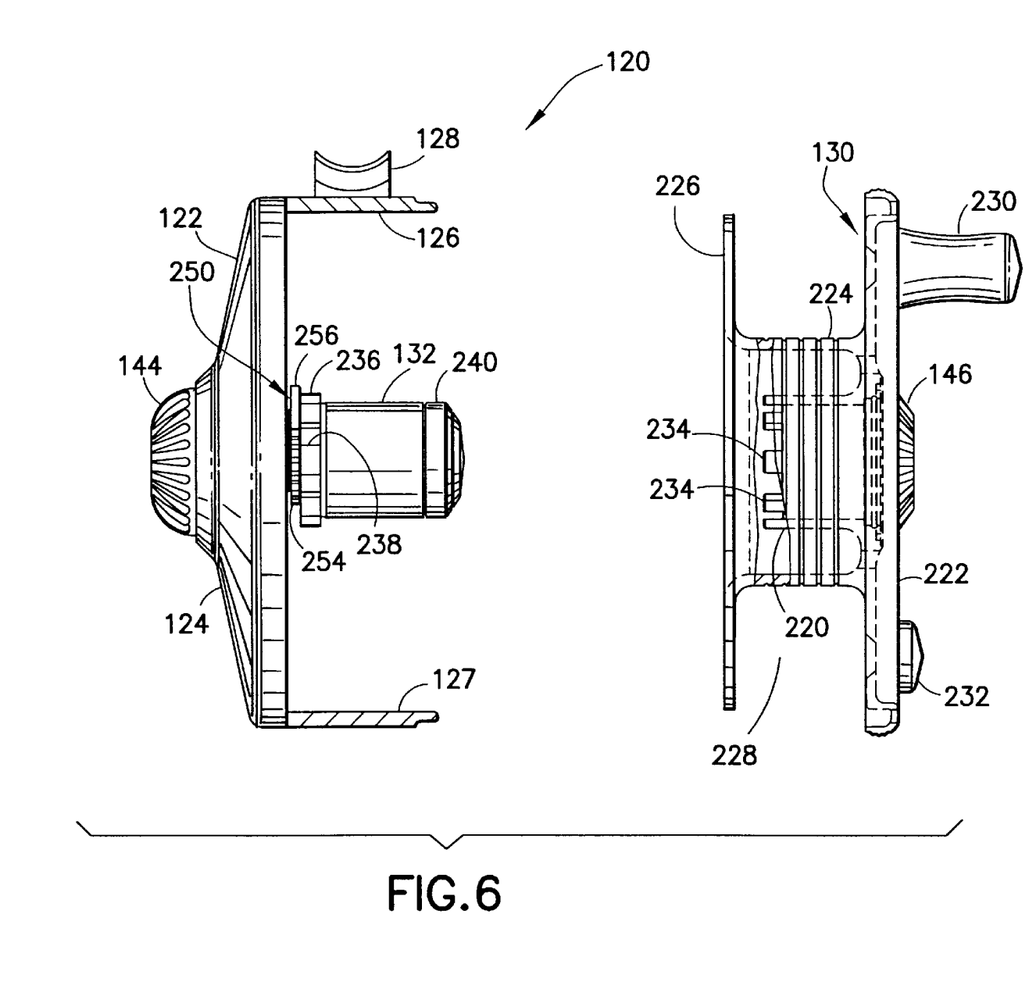
FIG. 6 is an end exploded view of the fly fishing reel of FIG. 3.
Figure 7:
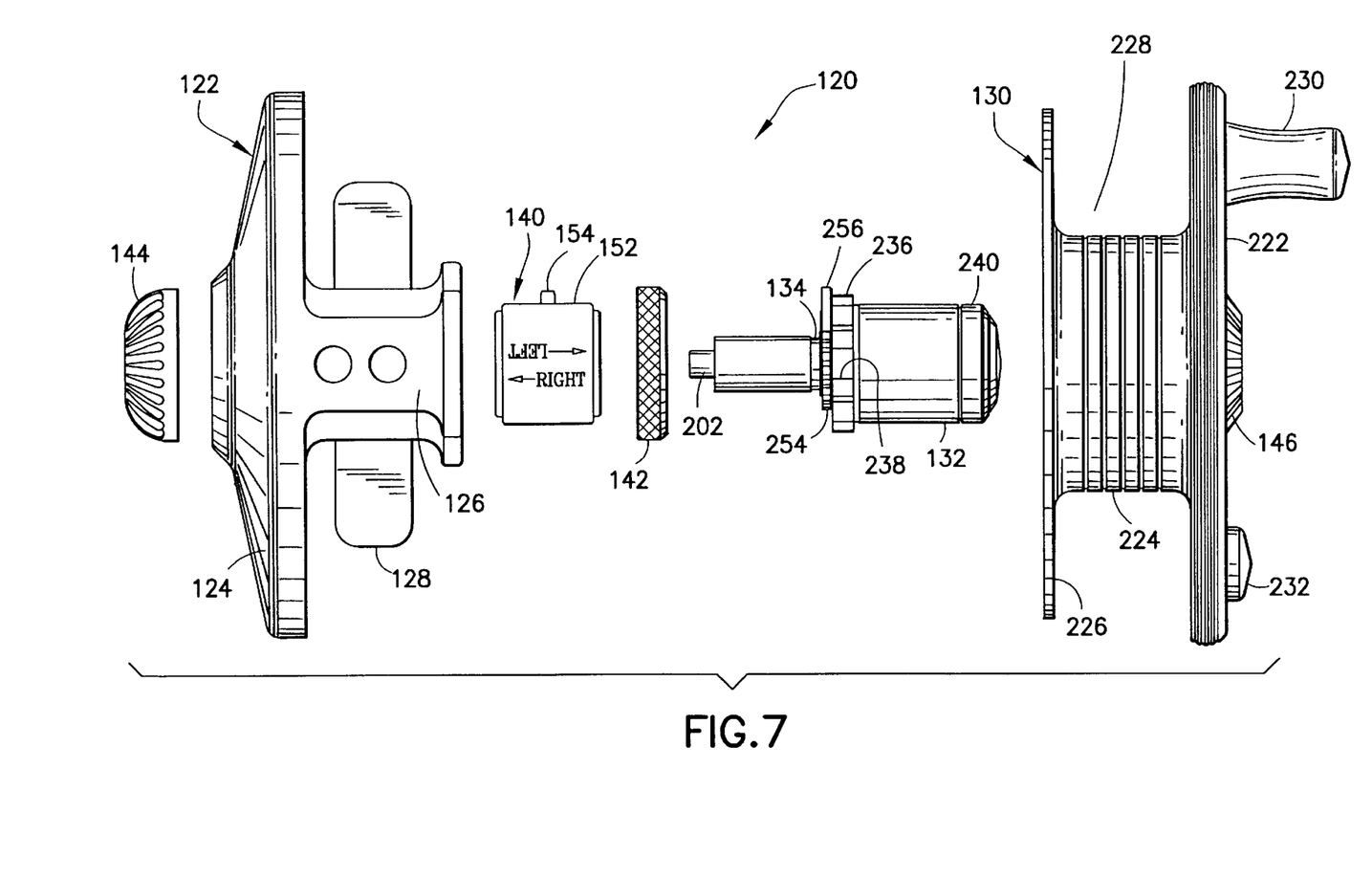
FIG. 7 is a bottom exploded view, partially cut away, of the fly fishing reel of FIG. 3.
Figure 8:
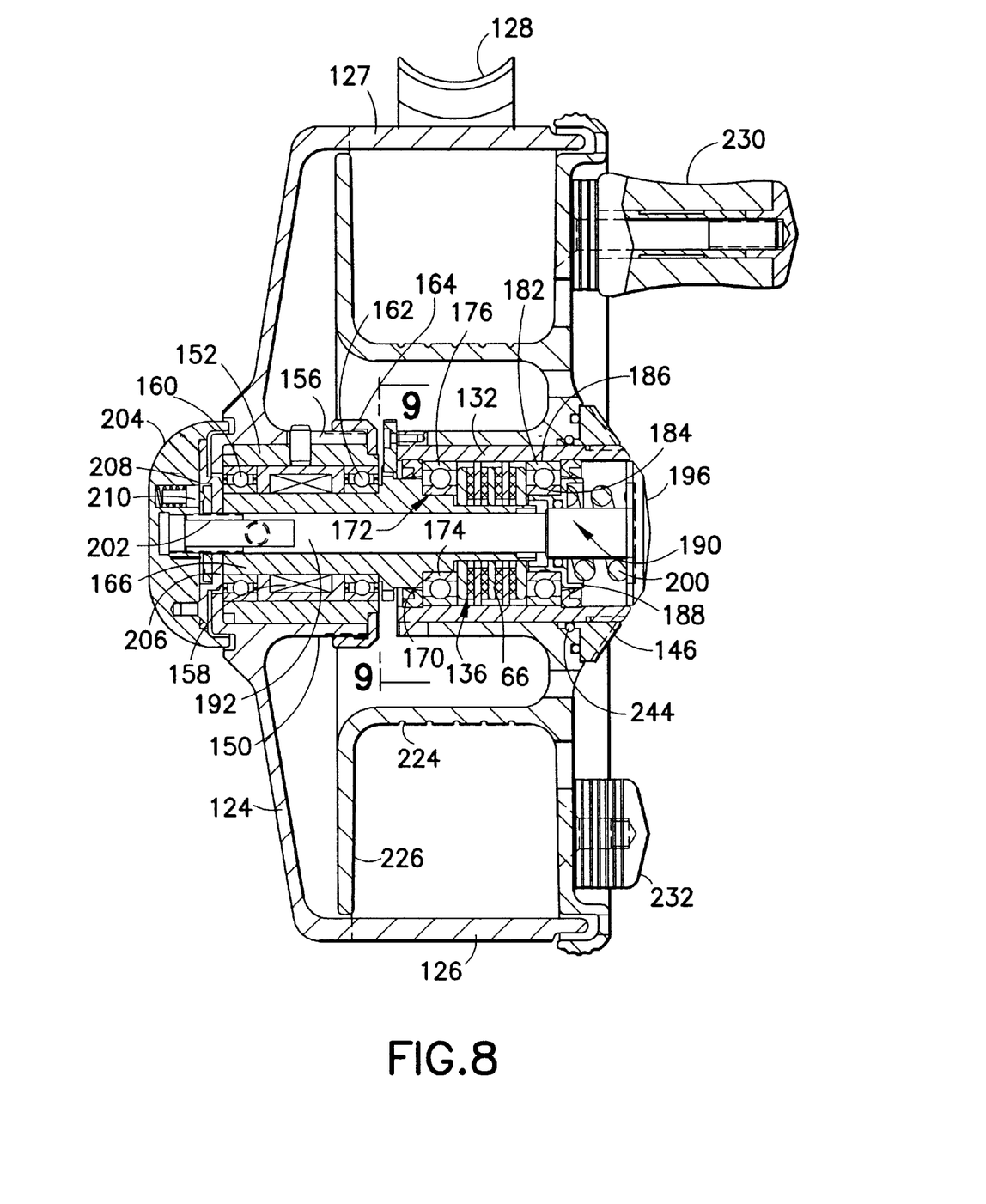
FIG. 8 is a sectional view of the fly fishing reel of FIG. 3, taken along the lines 8—8 of FIG. 5.

A spool 130, adapted for receiving fishing line, is mounted to an axle tube 132 extending from the frame 122. As best seen in FIGS. 6, 7 and 8, the hub 132 is mounted on a spindle 134 by means of a drag assembly 136, and a portion of the spindle extends into an anti-reverse assembly 140. The housing 152 of the anti-reverse assembly 140 is received in the frame 122 and secured therein by a cap nut 142. The end of the spindle is captured by a drag adjustment nut 144 on the exterior of the spool cover 124, and adjustably compresses the drag adjustment assembly. The spool 130 fits over the axle tube 132, and rotatably carries a spool lock nut 146 which secures the spool to the hub.

Referring now to FIG. 8, a tubular socket 150 extends inwardly from the spool cover 124. The anti-reverse assembly 140 includes tubular housing 152 that is received in the tubular socket 150. The tubular housing has a pin 154 extending outwardly therefrom, which is received in a slot 156 in the tubular socket 150. Within the tubular housing there is an anti-reverse clutch 158, flanked by bearing sets 160 and 162. The anti-reverse assembly is held within the tubular socket 150 by a cap nut 164.

The spindle 134 has a free end 166 that is received in the axial opening in the anti-reverse assembly 140. Thus, the spindle 134 may rotate in one direction, but not in the other. The remaining portion of the spindle 134 is surrounded by the axle tube 132 and is supported thereon by the drag assembly 136. The axle tube 132 is substantially cylindrical, and spaced from the spindle 134. The spindle 134 defines a clutch stop 170, and a first bearing assembly 172 is mounted adjacent the clutch stop 170. The bearing assembly 172 is a ball bearing with an inner race 174 and an outer race 176. The inner race butts against the clutch stop 170 and the outer race supports the axle tube 132. A second bearing assembly 182 is also a ball bearing having an inner race 184 and an outer race 186, with the outer race also supporting the axle tube 132. The inner race is supported on a step of a spring retainer cup 188 which slides on the shaft of draw bar 190, which extends axially through the spindle 134.

A clutch 194 in the form of a clutch pack of washers 66 is disposed between inner race 184 of the second bearing assembly 182 and the inner race 174 of first bearing assembly 172, which butts against the clutch stop 170. With reference to FIG. 2, the spindle 134 has flats similar to the flat 41 on the center hub 26, and the clutch pack of washers 66 illustrated in FIG. 2 are also used in the fly fishing reel 120. Therefore, the clutch pack washers includes end washers, drag washers, hexagonal washers providing engagement with the interior of the axle tube 132, which is shaped to engage them, and slotted washers 82 which engage with the spindle 134. Drag washers not keyed to either the axle tube or the spindle are interposed between the keyed washers. Upon compression of the clutch pack of washers between the second bearing assembly and the clutch stop 170, the drag between the spindle and the axle tube is increased, and the degree of compression sets the drag for the fly fishing reel 120.

In the fly reel 120, the clutch pack of washers is compressed by the draw bar 190. Draw bar 190 has a shaft 192 and head 196, and a compression spring 200 is received between the head 196 and the spring hub 188. As noted above, the spring cup 188 bears against the inner race 184 of the bearings 182. The shaft of draw bar 190 extends through the spindle to a threaded distal end 202 which is captured by the drag adjustment nut 144. The drag adjustment nut 144 includes an outer shell 204 and a bearing plate 206 which bears against the end of the spindle. A click detent plate 208 and spring biased detent pin 210 provide both a constant friction on the drag adjustment, regardless of how tight the drag set, to maintain the knob on the draw bar and also provides an audible indication of adjusting action.

Therefore, the drag for the fly fishing reel 120 is adjusted by turning the drag adjustment nut 144 to pull the draw bar 190 inwardly, compressing the spring 200 to in turn compress the clutch pack 66 of washers. This increases the friction between the spindle and the axle tube 132. Because the axle tube 132 is supported on the first and second bearing assemblies and the clutch pack operates independently of the bearing assemblies except to use their inner races to provide axial thrust, the drag adjustment is extremely precise, uniform and smooth, in the same manner as described above with respect to fishing reel 10.

The axle tube 132 mounts the spool 130 of the fly fishing reel 120. The spool 130 has an axial sleeve 220 which slides over the axle tube 132. A spool wall 222 extends radially outwardly from the axial sleeve, and has a spool surface 224 and second side wall 226 to define an annular line receiving pocket 228. A handle 230 and a counter weight 232 are mounted to the spool wall 226.

With particular reference to FIG. 6, the axial sleeve 220 of the spool 130 has a plurality of projections 234 on the end thereof. The axle tube 132 has a radial flange 236 which defines a plurality of slot openings 238, also seen in FIGS. 9 and 10. The finger projections 234 of the axial sleeve are received in the slots 238 of the flange 236 to secure the spool 130 against rotation with respect to the axle tube 132. Therefore, when the drag assembly acts on the axle tube 132, it also acts on the spool 130.

The distal end of the axle tube 132 is threaded at 240, and the spool 130 carries a spool lock ring 146 which screws on to the threaded end 240 to secure the spool on the hub. As best seen in FIG. 8, the spool lock ring 146 is retained for rotation on the spool wall by an o-ring 244 and which permits the lock ring to rotate for securing the spool on the hub, but does not permit the spool lock ring to separate from the spool.

Figure 9:
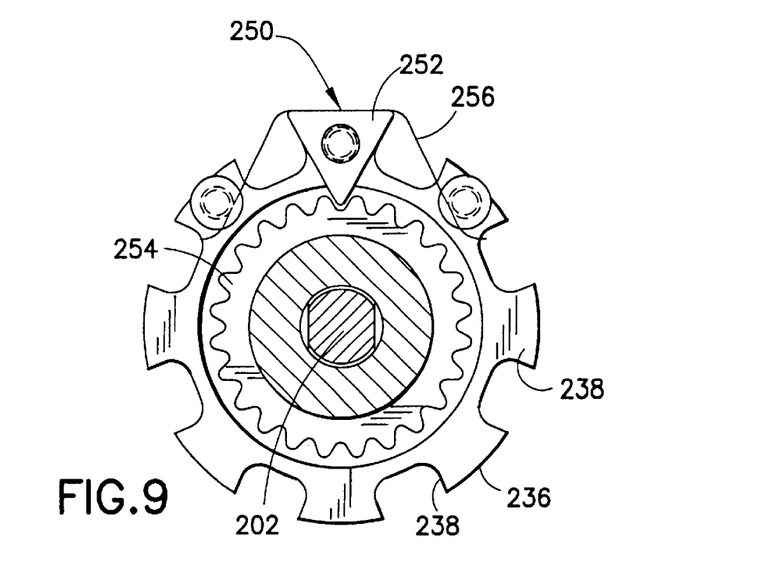
FIG. 9 is a sectional view of the fly fishing reel of FIG. 3, taken along the lines 9—9 of FIG. 8.
Figure 10:
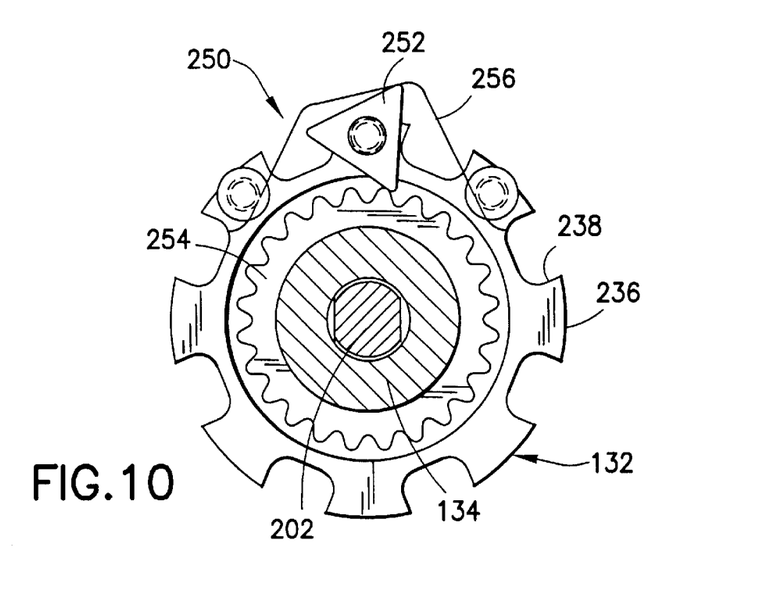
FIG. 10 is a view similar to FIG. 9, showing operation of the click mechanism of the drag assembly.

The radial flange 236 of axle tube 132 also carries a clicker mechanism 250, which provides audible signal of operation of the drag. With reference to FIGS. 9 and 10, the flange 236 pivotally mounts a triangular pawl 252 which engages with a toothed gear 254 formed on the spindle 134. The radial flange 236 also mounts a leaf spring 256 which extends over the base of the triangular pawl. Therefore, when the spindle rotates relative to the axle tube, i.e., when the drag assembly is providing for rotational release of the axle tube and spool with respect to the spindle, the triangular pawl serially engages the teeth of the gear 254. When the pawl is in the position shown in FIG. 10, it is about to be released from the one tooth, and when that occurs, the spring snap the pawl against the next adjacent tooth to provide a clicking sound. The clicker assembly 250 works equally well for rotation in each direction.

The fly fishing reel 120 also provides for altering the direction of rotation, as best illustrated in FIG. 7. This is accomplished by removing the spool 130, and thereafter removing the spindle, axle tube 132 and drag assembly as a unit by loosening and removing the drag adjustment nut 144. The cap nut 142 is then removed, permitting the housing 152 of the anti-reverse assembly 140 to be removed from the tubular socket 150 in the frame. The housing 152 may be turned 180° and reinserted in the tubular socket, the pin 154 being substantially centrally located and receivable in the slot 156 from either direction. The cap nut 142 is then replaced, the spindle, axle tube and drag assembly are replaced and captured by the drag adjustment nut 140 and the spool is mounted on the hub 132. Because the anti-reverse housing 152 is turned around, the anti-reverse clutch operates 158 in the opposite direction, providing for an opposite direction of rotation of the spool 130.

The foregoing structure offers many advantageous aspects of operation. With reference to FIG. 6, the spool 130 is easily removed from the frame 122 of the fly fishing reel 120 by merely loosening the spool lock ring 146 and sliding the spool from the hub 132. Even after removal of the spool, it remains a one piece unit for handling, by virtue of the spool lock ring being secured with the spool. The spool has none of the moving parts of the reel, i.e., the anti-reverse and drag mechanisms are all retained on the frame. Therefore, the spool 130 can be replaced with another spool carrying, for instance, a different weight or color of line without disrupting the major mechanical components of the reel.

Of course, all of the foregoing features are accomplished in combination with the drag assembly featuring a clutch pack and independently rotating hub and spool, providing a very smooth and accurate fly fishing reel.

Accordingly, fishing reels incorporating a drag assembly has been provided which are capable of sensitive adjustment as well as accurate and smooth operation. The drag assembly provides for sealing, so that it is unaffected by moisture and dirt, and will therefore give a long period of satisfactory service.

It will be appreciated that changes and modifications varied to fit particular operating requirements and environments will be apparent to those skilled in the art and that the invention is not considered limited to the examples chosen for purposes of illustration, and includes all changes and modifications do not constitute a departure from the true spirit and scope of this invention as claimed in the following claims and equivalents thereof.

I claim:

1. A fishing reel comprising:
   A) a frame adapted for mounting the fishing reel to a rod;
   B) a spindle mounted in anti-reverse means received in the frame for one way rotation with respect to the frame;
   C) an axle tube mounted on the spindle by a drag assembly for adjustably permitting rotation of the axle tube against the anti-reverse means; and
   D) a spool removably received and secured in interlocking engagement on the axle tube, thereby adapting the fishing reel for spool replacement independent of the anti-reverse means and drag assembly.

2. A fishing reel as defined in claim 1 wherein the axle tube is generally cylindrical and the spool has an axial sleeve that slides over the axle tube into interlocking engagement therewith.

3. A fishing reel as defined in claim 2 wherein one of the axle tube and the sleeve has at least one slot and the other of the axle tube and sleeve have at least one projection that is slidingly received in the at least one slot.

4. A fishing as defined in claim 3 wherein the axle tube has a radial flange extending therefrom adjacent the frame, the flange defines a plurality of slots, and the axial sleeve of the spool defines a plurality of axially extending projections at its distal end that are receivable in the slots of the radial flange.

5. A fishing reel as defined in claim 4 wherein the axle tube has a threaded distal end and the spool is secured on the hub by a spool lock ring threaded on to the end of the axle tube.

6. A fishing reel as defined in claim 5 wherein the spool lock ring is rotationally secured with the spool and is removable and replaceable with the spool without separation from the spool.

7. A fishing reel as defined in claim 4, and further comprising
   an audible clicker mechanism for indicating relative rotation of the spindle and axle tube, the clicker mechanism comprising a toothed gear on the spindle, a bi-directional pawl pivotally mounted on the radial flange of the axle tube for engaging the toothed gear, and spring means biasing the bi-directional pawl towards a neutral position, wherein displacement of the pawl by relative rotation of spindle and axle tube pivots the pawl and then releases the pawl, and the spring means sharply returns the pawl against the next toothed to create an audible click.

8. A fishing reel as defined in claim 1 wherein the axle tube has a threaded end and the spool is secured on the axle tube by a spool lock ring threaded on to the end of the axle tube.

9. A fishing reel as defined in claim 8 wherein the spool lock ring is rotationally secured with the spool and is removable and replaceable with the spool without separation from the spool.

10. A fishing reel as defined in claim 1 wherein the anti-reverse means comprises an anti-reverse housing removably and reversibly received in a tubular socket defined by the frame for mounting the spindle for one way rotation with respect to the frame, wherein the spindle is removably mounted by said anti-reverse means and the direction of one way rotations changeable by reversing the position of the anti-reversing means housing in the tubular socket defined by the frame.

11. A fishing reel as defined in claim 10 wherein the anti-reversing housing is generally cylindrical and has a key received in a slot defined by the frame, thereby securing the anti-reverse housing from rotation within the frame.

12. The fishing reel as defined in claim 1 wherein the spindle extends at least partially through the axle tube, the spindle mounted in and extending from the anti-reverse means, and the drag assembly rotatably mounts the axle tube surrounding the spindle, the drag assembly having:
   (1) a first bearing assembly mounted between the spindle and the axle tube supporting a first inner side of the axle tube more closely adjacent the frame,
   (2) a second bearing assembly mounted between the spindle and the axle tube and having an inner ring and an outer ring, the second bearing assembly supporting a second outer side of the axle tube more closely adjacent the distal end of the axle tube,
   (3) a clutch received between the inner ring of the second bearing assembly and a clutch stop fixed with respect to the spindle, the clutch including at least one clutch secured to the spindle and at least one clutch secured to the axle tube, and (4) an adjustment mechanism for adjustably compressing the clutch members between the inner ring of the second bearing assembly and the clutch stop, the clutch thereby providing an adjustable frictional drag engagement between the spindle and the axle tube, and the spool mounted on the axle tube.

13. A fishing reel as defined in claim 12, wherein the clutch members are a clutch pack of washers having drag washers keyed to the spindle alternating with drag washers keyed to the axle tube.

14. A fishing reel as defined in claim 13, wherein the second bearing assembly having an inner ring and an outer ring is a ball bearing assembly having an inner race and an outer race.

15. A fishing reel as defined in claim 13, wherein the end drag washer of the clutch pack adjacent the second bearing assembly is keyed to the spindle and engaged by the inner ring, and the spindle-keyed end drag washer is configured for clearance from the outer ring of the bearing assembly.

16. A fishing reel as defined in claim 15, wherein the clutch pack of drag washers includes a friction washer between each drag washer keyed to the spindle and the adjacent drag washer keyed to the axle tube.

17. A fishing reel as defined in claim 16, wherein the clutch pack of disks includes three drag washers keyed to the spindle, two drag washers keyed to the axle tube, and four friction washers, each friction washer interposed between a drag washer keyed to the spindle and a drag washer keyed to the axle tube.

18. A fishing reel as defined in claim 13, wherein the drag washers keyed to the axle tube have a polygonal outer edge received and engaged by the axle tube.

19. A fishing reel as defined in claim 18, wherein the drag washers keyed to the axle tube have an octagonal outer edge.

20. A fishing reel as defined in claim 13, wherein the adjustment mechanism includes a draw bar extending through the axle tube and spindle to a drag adjustment nut adjacent the frame of the fishing reel, and the draw bar has a head for engaging and compressing the clutch pack against the clutch stop as the drag adjustment nut is tightened.

21. A fishing reel as defined in claim 20, wherein the drag assembly also has a spring cup and spring positioned between the head of the draw bar and the clutch pack of washers.

22. A fishing reel as defined in claim 21, wherein the spring cup bears on the inner race of the second bearing assembly, which bears on the clutch pack of washers.

23. A fishing reel as defined in claim 20, wherein the drag adjustment nut has an internal detent friction mechanism maintaining it on the threaded end of the draw bar at low drag pressures.

24. A fishing reel as defined in claim 13, wherein the adjustment mechanism includes a draw bar extending through the axle tube and spindle to a threaded end adjacent the frame of the fishing reel, a drag adjustment nut threaded on the threaded end of the draw bar adjacent the frame of the fishing reel, and the draw bar has a head for engaging and compressing the clutch pack against the clutch stop as the drag adjustment nut is tightened.

25. A fishing reel as defined in claim 24, wherein the drag assembly also has a spring cup and spring positioned between the head of the draw bar and the clutch pack of washers.

26. A fishing reel as defined in claim 25, wherein the spring cup bears on the inner race of the second bearing assembly.

27. A fishing reel as defined in claim 24, wherein the drag adjustment nut has an internal detent friction mechanism maintaining it on the threaded end of the draw bar at low drag pressures.

28. A fishing reel as defined in claim 12, wherein the second bearing assembly having an inner ring and an outer ring is a ball bearing having an inner race and an outer race.

29. A fishing reel as defined in claim 28, wherein the first bearing assembly is a ball bearing having an inner race and an outer race, and the inner race is positioned between the clutch stop and the clutch.

30. A fishing reel as defined in claim 29, wherein the clutch members are a clutch pack of washers having drag washers keyed to the spindle alternating with drag washers keyed to the axle tube.

31. A fishing reel as defined in claim 30, wherein the clutch pack of drag washers includes a friction washer between each drag washer keyed to the spindle and the adjacent drag washer keyed to the axle tube.

32. A fishing reel as defined in claim 3, wherein the drag washers keyed to the axle tube have a polygonal outer edge received and engaged by the axle tube.

33. A fishing reel as defined in claim 1, and further comprising an audible clicker mechanism for indicating relative rotation of the spindle and axle tube, the clicker mechanism comprising a toothed gear mounted on one of said spindle and said axle tube, a bi-directional pawl pivotally mounted on the other of said spindle and said axle tube for engaging the toothed gear, and spring means biasing the bi-directional pawl towards a neutral position, wherein displacement of the pawl by relative rotation of the pawl and toothed gear pivots the pawl and then releases the pawl, and the spring means sharply returns the pawl against the next tooth to create an audible click.

34. A fishing reel comprising:
A) frame adapted for mounting the fishing reel to a rod;
B) anti-reverse means removably and reversibly mounted in the frame the anti-reverse means having a generally tubular housing having a pin extending therefrom, and the frame defining a tubular socket further defining a longitudinal slot, the tubular socket and longitudinal slot respectively receiving the housing and pin of the anti-reverse means; and
C) spool means removably mounted on a spindle received by the anti-reverse means, whereby upon removal of the spool means and reversal of the anti-reverse means in the frame, the direction of anti-reverse action is selectably changed.

* * * * *